July 5, 1955   S. BADLAM   2,712,250
FEED TABLE AND INDEXING MEANS THEREFOR
Filed Dec. 27, 1948   10 Sheets-Sheet 2

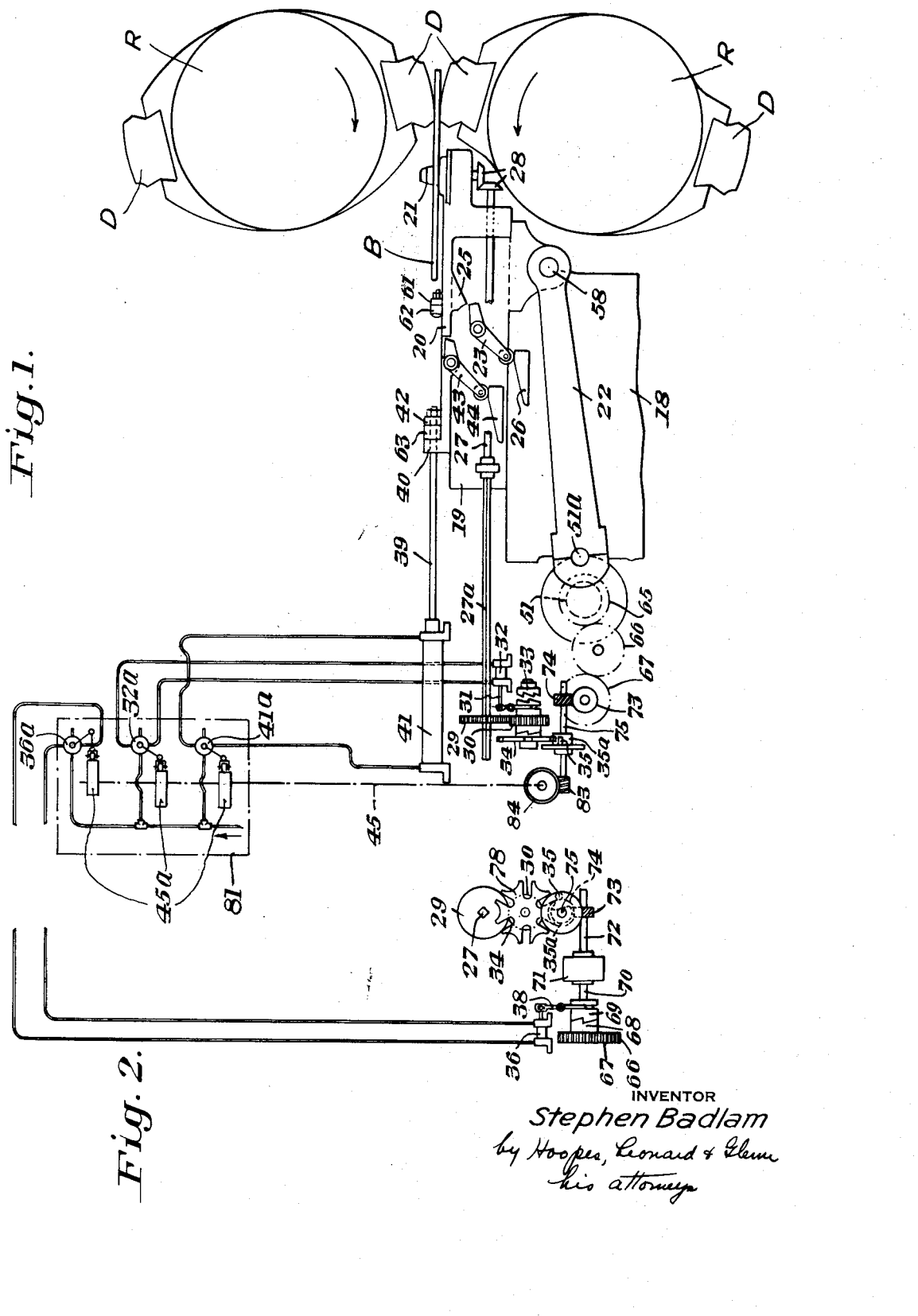

Work holder 20 and carriage 19 on forward stroke

Work holder 20 and carriage 19 on return stroke

Work holder 20 at end of return stroke. (Carriage 19 still on return stroke).

INVENTOR
Stephen Badlam
by Hoopes, Leonard & Glenn
his attorneys

Work holder 20 at loading and unloading position

Work holder 20 and carriage 19 both at end of return stroke

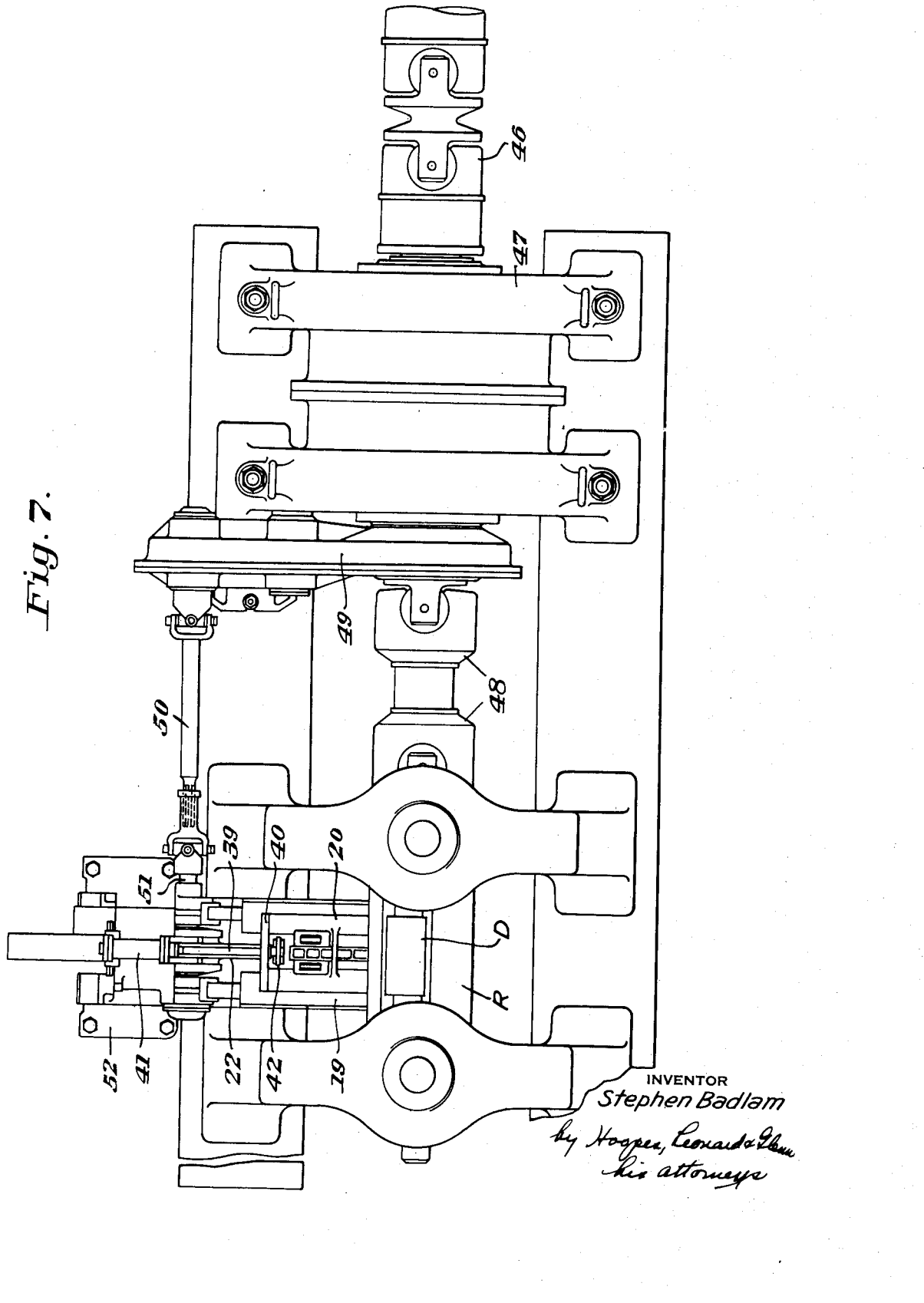

July 5, 1955  S. BADLAM  2,712,250
FEED TABLE AND INDEXING MEANS THEREFOR
Filed Dec. 27, 1948  10 Sheets-Sheet 5
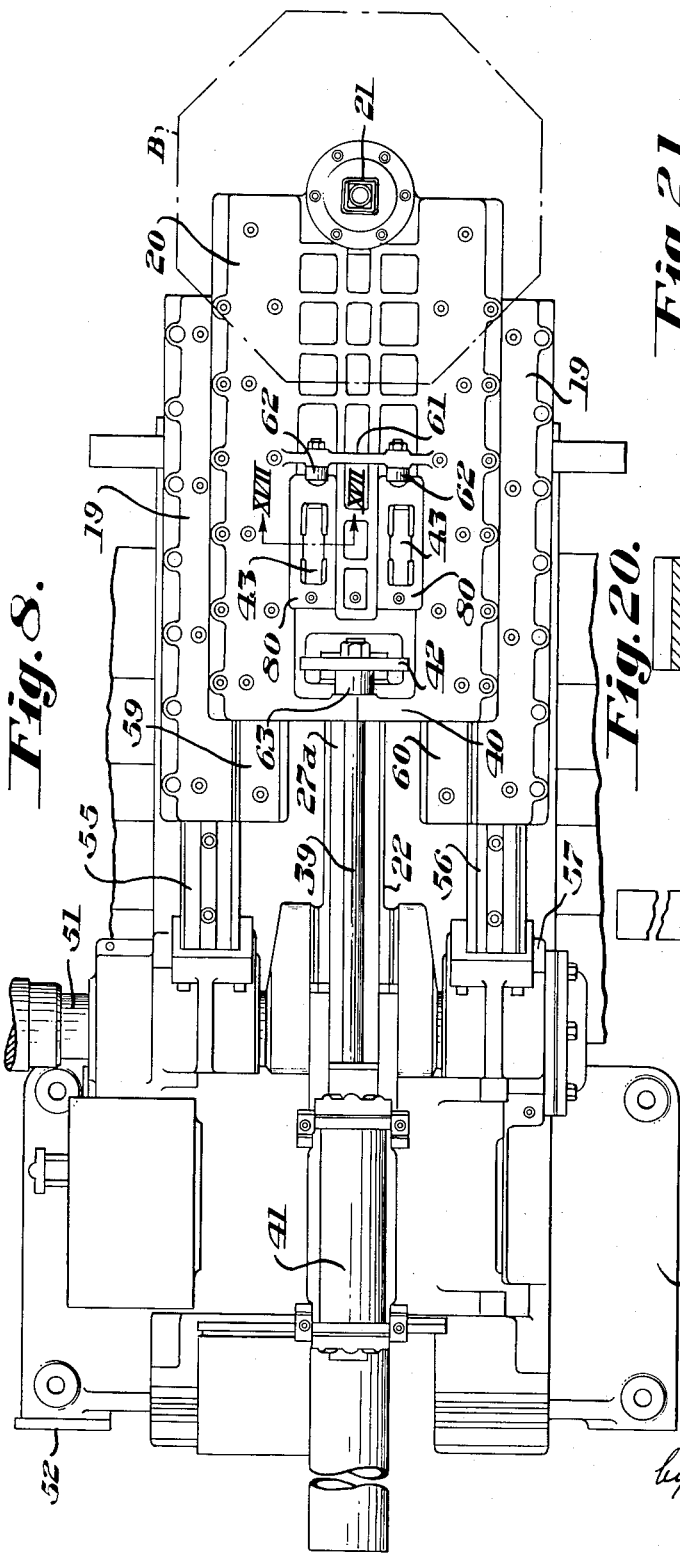
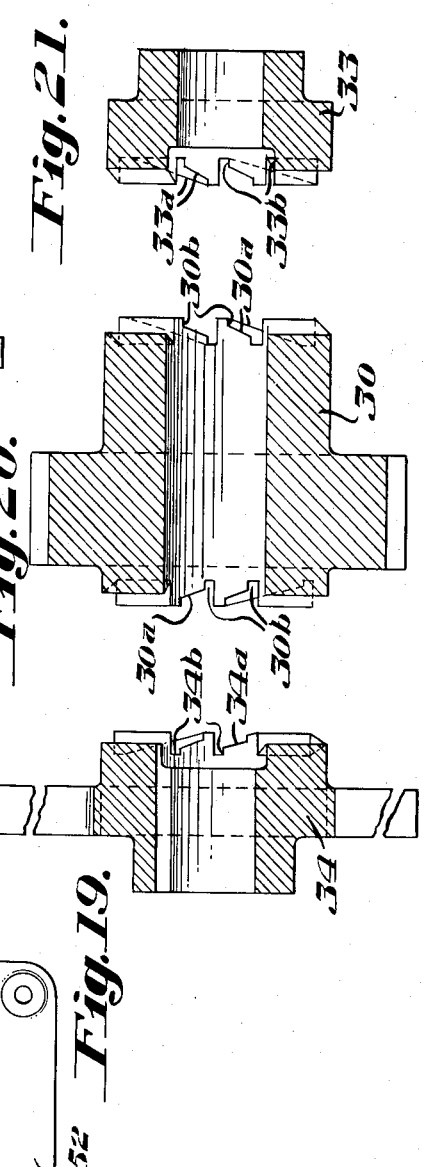
INVENTOR
Stephen Badlam
by Hooper, Leonard & Glenn
his attorneys July 5, 1955  S. BADLAM  2,712,250
FEED TABLE AND INDEXING MEANS THEREFOR
Filed Dec. 27, 1948  10 Sheets-Sheet 6
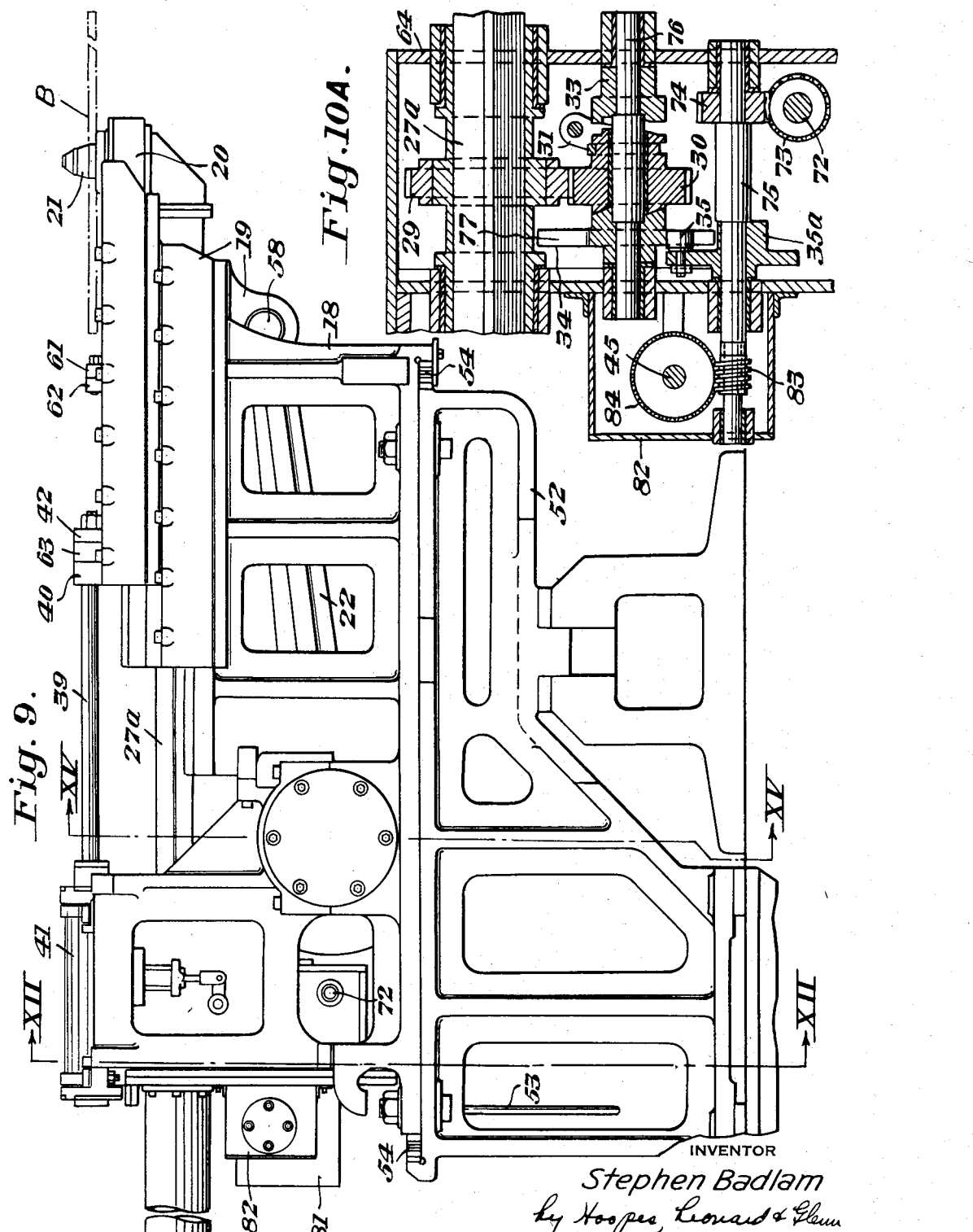
INVENTOR
Stephen Badlam
by Hoopes, Leonard & Glenn
his attorneys

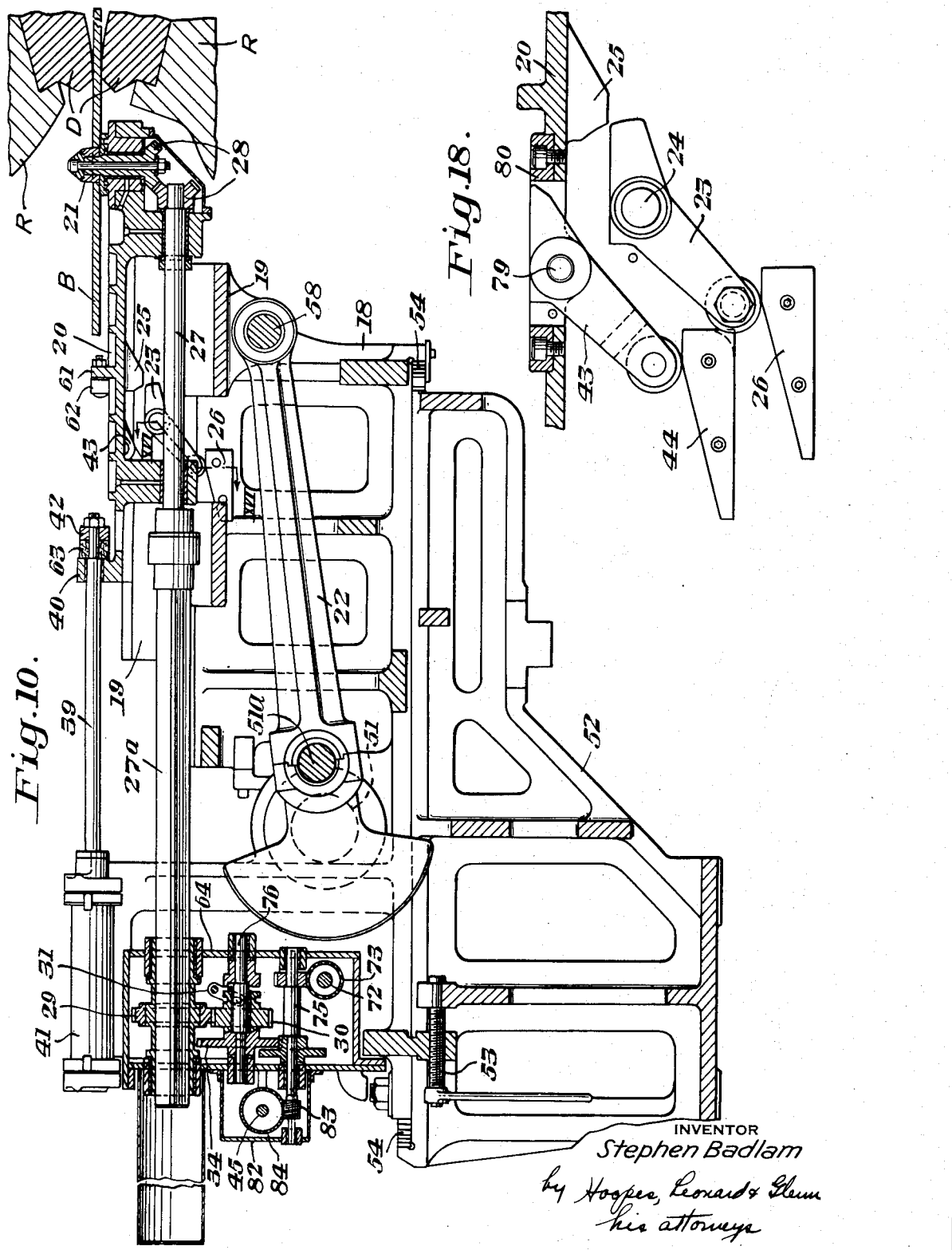

July 5, 1955 S. BADLAM 2,712,250
FEED TABLE AND INDEXING MEANS THEREFOR
Filed Dec. 27, 1948 10 Sheets-Sheet 8

INVENTOR
Stephen Badlam
by Hooper, Leonard & Glenn
his attorneys

July 5, 1955

S. BADLAM 2,712,250

FEED TABLE AND INDEXING MEANS THEREFOR

Filed Dec. 27, 1948

INVENTOR
Stephen Badlam
by Hoopes, Leonard & Glenn
his attorneys

INVENTOR
Stephen Badlam
by Hooper, Leonard & Glenn
his attorneys

United States Patent Office 2,712,250
Patented July 5, 1955

2,712,250

FEED TABLE AND INDEXING MEANS THEREFOR

Stephen Badlam, Rosslyn Farms, Pa., assignor, by mesne assignments, to Blaw-Knox Company, Pittsburgh, Pa., a corporation of Delaware Application December 27, 1948, Serial No. 67,527

18 Claims. (Cl. 80—16)

This invention relates to a feed table and indexing means therefor whereby blanks which are to be processed are alternately fed to and withdrawn from a machine for processing the blanks. The invention is specifically embodied in a table and indexing means for feeding blanks to gap roll mills to produce tapered disks and relates to improved apparatus for feeding the blanks to be rolled in accordance with the method of the Ingersoll et al. Patent 1,933,593.

The Ingersoll method comprises cutting a blank usually in the shape of a polygon and preferably an octagon and feeding the blank to the mill so that the dies of the gap rolls engage the blank at a predetermined distance from its center and roll it radially and outwardly. The dies roll a truncated sector of the blank during each pass and the passes are effected in sequence with the blank being held at its center on a feed table during the entire operation and rotated by mechanism associated with the table to present sectors to be rolled in the order desired. The sequence preferred in the Ingersoll process is eight passes along paths or radii normal to the peripheral flats of the blank followed by eight passes along paths or radii through the peripheral corners of the blank and midway between the first paths or radii. Any alternative sequence may be followed using my apparatus if so desired.

My invention provides a feed table and indexing means therefor by means of which tapered disks can be rolled on a gap mill according to the above cycle or any desired cycle with greatly improved results. Specifically, my feed table obtains increased production and decreased scrap loss. It can operate for longer periods of time than has heretofore been possible without breakdowns or stoppages for repairs.

To obtain these objectives, several difficult problems have been overcome. A few problems are:

(1) The feed table must be synchronized exactly with the gap rolls so that the blank is fed to the dies on the rolls in the proper position when the dies engage the workpiece.

(2) The rolls must be rotated at a substantial speed to obtain good production. In actual practice the peripheral speed of the working surfaces of the dies may reach four hundred feet per minute or more. It follows that the blank and all portions of the feed table which carry and move in unison with the blank travel at substantial rates of speed. During each pass these parts must be returned to the rolls for a subsequent pass within a very short period of time. Tremendous forces of acceleration and deceleration are encountered causing heavy shocks to the moving parts. These forces must be diminished in order to obtain uninterrupted production.

(3) It is necessary to load a blank and unload a finished disk on and off the feed table. The portion of the table which holds the blank must be pulled away from the rolls and after the new disk is in place returned in a manner which will insure correct timing of the feed with the rolls.

(4) The blank must be rotated between passes and this rotation must be done in a very short period of time and its amount must be accurately controlled to obtain precise orientation of the blank with the rolls. The blank is a flat piece which after rolling ranges from 20 to 30 inches in diameter which sometimes weighs as much as sixty to seventy pounds and therefore has a large moment of inertia. Therefore, the forces of angular acceleration and deceleration which occur tend to seriously impair the accuracy of indexing. The problem of deceleration is particularly acute. In prior feed tables a large angular momentum developed, frequently caused overrunning and this in variable amount increasing as the radius of the work after rolling increases because of the increased angular momentum. Proper orientation of the blank with the rolls is important. If the blank is not properly oriented it will be elongated more along some paths or radii than others so that the periphery of the finished disk must be substantially trimmed or the entire disk scrapped with resultant high scrap losses. It is equally important that once oriented the blank be held in that position.

(5) The disks are hot rolled which means that the indexing and feeding mechanism must be protected from the heat, scale, water, etc., incidental to all hot rolling operations.

As will hereinafter appear, I have invented a feed table and indexing means therefor which overcome all of the foregoing difficulties and obtain the results desired; namely, high production, low scrap loss and low maintenance costs.

In the accompanying drawings I have illustrated a present preferred embodiment of my invention, in which Figures 1 and 2 are diagrams indicating the various working parts of my invention and their relationship to each other and to the gap mill; Figure 2 being a left-hand "end view" of Figure 1;

Figures 3 to 6, inclusive, are diagrams similar to a part of Figure 1 showing the feed table in various operating positions;

Figure 7 is a plan view of the rolling mill and my feed table;

Figure 8 is a plan view of my feed table;

Figure 9 is a side elevation of my feed table;

Figure 10 is a vertical section along the lines X—X of Figure 11;

Figure 10A is a portion of Figure 10 on an enlarged scale to better illustrate the indexing means;

Figure 18 is a side view of latches employed in my feed table; and

Figures 19, 20 and 21 are vertical sections of gears employed in my indexing means.

*General description—Figures 1 to 6, inclusive*

Figure 3:
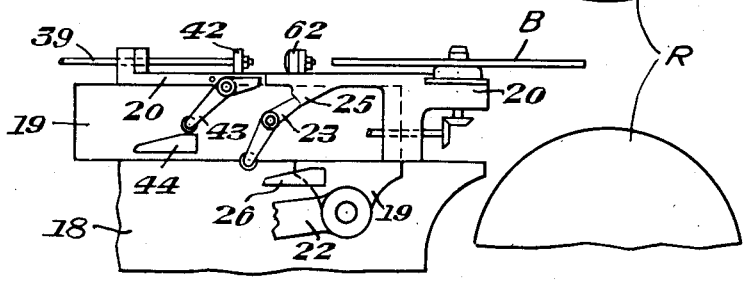

Figures 1 and 2 show diagrammatically the rolling mill, the table for feeding blanks to the rolls and the mechanism for indexing the blanks, the purpose of these two figures being to show the relationship of all the working parts to each other. The mill comprises two gap rolls R each roll having two replaceable dies D in the nature of shoes. In Figure 1 a disk blank B is shown in its forwardmost position in the mill when the dies D first engage the blank.

The feed table comprises a frame or support 18, a carriage or intermediate support 19 slidable on the frame or support toward and away from the mill rolls R and a work-holder 20 which is slidable on the carriage 19 in the direction of movement of the carriage. A pin 21 rotatably and vertically mounted in the end of the workholder 20 nearest the rolls carries the flat blank B. The end of the pin 21 which extends above the workholder is square in section to key with a square hole punched in the center of each blank so that rotation of the pin will rotate the blank. A connecting rod 22 driven by a crank shaft geared to the roll drive moves the carriage 19 as hereinafter described in greater detail. The carriage thus reciprocates on the table 18 with substantially simple harmonic motion in timed relationship with the rolls.

A pair of latches 23 pivoted on pins 24 on the carriage 19 engage lugs 25 on the workholder 20 to move the workholder forward and thereby feed the disk blank to the rolls on forward movement of the carriage (see Figure 3). At the extreme forward movement of the workholder the latches 23 ride on to fixed cams 26 on the frame 18 and are thereby tilted out of engagement with the fixed cams and to inoperative position (see Figure 1). The workholder 20 is thereafter free to move away from the rolls independently of the carriage 19 and is driven on its return stroke by action of the roll dies on the blank. Because of the peripheral speed of the roll dies the workholder returns considerably faster than the carriage (see Figures 4 and 5).

It will be recalled that the blanks are preferably in the form of octagons and that each blank is first rolled along paths from its center or radially outwardly at right angles to its peripheral flats with one pass for each peripheral flat. Thereafter the blank is rolled along paths from its center toward its peripheral corners or radially outwardly through its peripheral corners and midway of the first paths or radii. Therefore it is necessary that the blank be rotated 45° between consecutive passes for a series of eight passes, turned 22½° and rolled for eight additional passes, the blank being again rotated 45° between consecutive passes. I provide a shaft 27 journalled in the workholder 20 and geared to the pin 21 by a pair of miter gears 28 to rotate the blank as required. The shaft is coupled to a square shaft 27a which fits in a square opening in an indexing gear 29. The shaft 27a can slide axially through and at the same time be turned by the indexing gear.

Two separate drives are provided for the indexing gear 29. They are connected to the gear 29 by means of a gear 30 which has clutch teeth on both hub faces and which may be shifted along a shaft 76 by a clutch fork 31 actuated by a fluid cylinder 32. A clutch collar 33 and a Geneva wheel 34 each having clutch teeth cut in one hub face are keyed to the shaft 76 on which the gear 30 freely rotates. A Geneva pin 35 driven in synchronism with the rolls R rotates the Geneva wheel 34. To control the rotation of the indexing gear 29 the cylinder 32 is actuated to engage the gear 30 with the clutch collar 33 or with the Geneva wheel 34. As will be explained hereinafter, if the gear 30 is in engagement with the Geneva wheel 34 the effect of one revolution of the Geneva pin 35 is to rotate the gear 29 through 45°. If the gear 30 is shifted to contact the clutch collar 33 the effect of one revolution of the pin 35 is to rotate the gear 29 22½°. With the gear 30 in engagement with the clutch collar 33 subsequent revolutions of the pin 35 each rotate the gear 29 through 45°. The drive for the pin 35 is controlled by a fluid cylinder 36 which actuates a clutch 69 by means of a clutch fork 38.

After a blank has been rolled it is necessary to withdraw the workholder 20 a sufficient distance from the rolls R to permit removal of the finished disk and then placing of the next blank on the pin 21. A piston rod 39, sliding in a bracket 40 of the workholder 20 and actuated by a fluid cylinder 41 and latches 43 positioned on pins 79 on the workholder 20 and engageable with a cross arm 42 secured to the piston rod, is provided for this purpose. Like latches 23, the latches 43 when hanging freely have their forward ends tilted up. The action of the piston rod 39 and latches 43 will best be understood in relation to the sequence of operation which will now be described in connection with Figures 1 and 3 to 6 inclusive.

Figure 4:
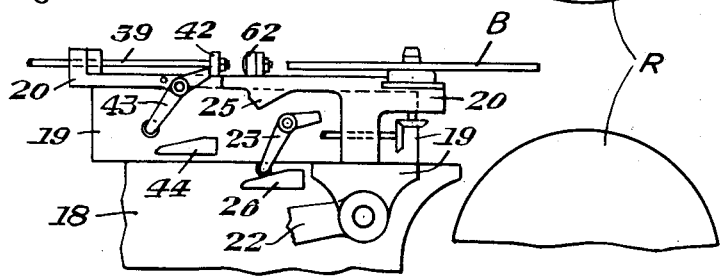
Figure 5:
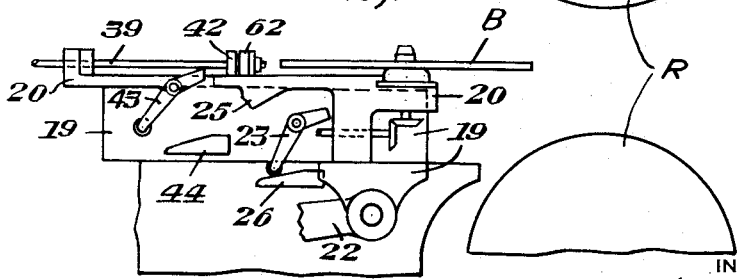
Figure 5A:
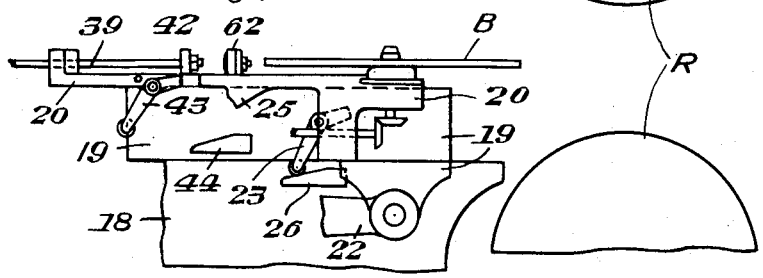
Figure 6:
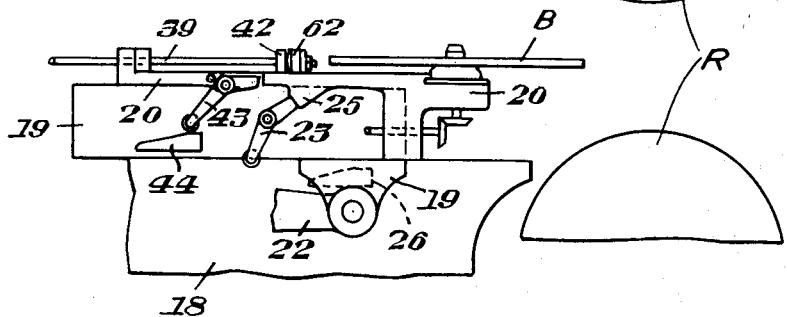

Assuming the several parts of the apparatus to be in the position shown in Figure 1 and with no part of the blank yet rolled, the workholder 20 is free to slide away from the rolls R to the left uncontrolled by the movement of the carriage 19 by reason of the latches 23 being cammed out of engagement with the workholder to inoperative position. The dies D engage the blank B as shown in Figure 1 and move the blank and the workholder to the left more rapidly than the carriage 19 is returned by the connecting rod 22 (see Figure 4). As a result the latches 43 are carried to the left more rapidly than the fixed cams 44 on the carriage 19 so that the latches 43 are free to slide under the cross arm 42, which is now stationary, and to assume operative position for engagement by the cross arm as shown in Figures 4 and 5. The Geneva wheel 34 is now actuated to turn the blank 45°. While this is occurring, the connecting rod 22 is returning the carriage 19 to its most retracted position (see Figure 5). The return movement of the carriage causes the cams 44 to move under the latches 43 restoring them to the inoperative position of Figures 1, 3 and 6 clearing the cross arm 42 and thereby freeing the workholder 20 for its forward stroke. Also, on the return stroke of the carriage 19, the latches 23 move under the lugs 25 and then engage them (see Figure 6). By this time the crank for the connecting rod 22 has completed a half rotation from the position of Figure 1 and continued rotation returns the parts to the position of Figure 1 by advancing or moving forward the carriage 19 and the workholder 20, the latter being carried out by the latches 23 and the lugs 25. These normal movements are repeated until eight passes have been made, after which the blank is turned 22½° and a pass made and then seven more passes are completed with the blank turned 45° between each of these latter passes at which time the rolled blank is ready to be removed. At this phase of the operation and when the parts are in the position of Figure 5 with the latches 43 in operative position for engagement by the cross arm 42 the piston rod 39 is retracted to retract the workholder a greater than normal distance to the left by means of the cross arm 42 and latches 43 to the position shown in Figure 5a. In this position of the workholder 20 the latches 23 cannot ride under the lugs 25 and the cams 44 cannot engage the latches 43 so that the workholder 20 remains stationary although the carriage which supports it continues to reciprocate beneath it. In this position of the workholder 20 as shown in Figure 5a the clutch 69 is uncoupled so that the work table cannot be turned while removing a finished blank from or placing an unfinished blank on the work table. The rolled disk is now removed and the succeeding blank is put in place on the pin 21. The clutch 69 is then coupled by manual operation of a valve to energize the cylinder 36 after which the cylinder 41 is energized and the piston rod 39 is moved to the right. Then the cylinder 32 is energized and the gear 30 coupled with the Geneva wheel 34 thereby turning the blank and the work table 22½° so that when it is moved to its forwardmost position for engagement by the roll dies, it will be rolled along a path or radius outwardly from its center at right angles to one of its peripheral flats. It will be noted that when the cylinder 41 is energized the cross arm 42 on the piston rod 39 engages rubber pads 62 mounted on the workholder 20 and thereby moves the workholder to the right in the position shown in Figure 6 at which time the lugs 25 will engage the latches 23 on the next return stroke of the carriage 19 and the cam 44 will engage the latches 43. In consequence, the workholder will again be moved forward by the carriage 19 to the position of Figure 1.

Four-way valves 32a, 36a and 41a control the operation of the cylinders 32, 36 and 41 respectively in synchronism with the rolls. These valves are preferably located in the housing 81 and are each connected to the opposite ends of the associated cylinder by two pipes so that the pistons within the cylinders may be moved by fluid pressure, preferably compressed air, in either direction. The valves are operated by the cams 45a on the shaft 45 geared to the drive for the Geneva pin 35 (see Figure 1). The cams are located in the housing 81. The valve 36a is also manually operable to control the flow of fluid to the cylinder 36 to couple the clutch 69 and connect the indexing and timing mechanisms in synchronism with the roll drive.

*Feed table—Figures 7–10 inclusive and 15–18 inclusive*

Figure 7 shows the complete assembly of the rolling mill and the feed table and the drives therefor. A conventional mill drive including an electric motor and a speed reducer supplies power through a conventional universal joint drive breaker spindle 46 to a pinion stand 47 which in turn drives the rolls through the universal spindles 48 and the gear reducing train 49 geared to one of the pinion shaft drives. A universal shaft 50 is connected to a crank shaft 51, driving a crank pin 51a connected to one end of connecting rod 22. Crank shaft 51 is journalled in the feed table. In the present instance, the crank shaft is rotated twice for each rotation of the rolls.

Figure 15:
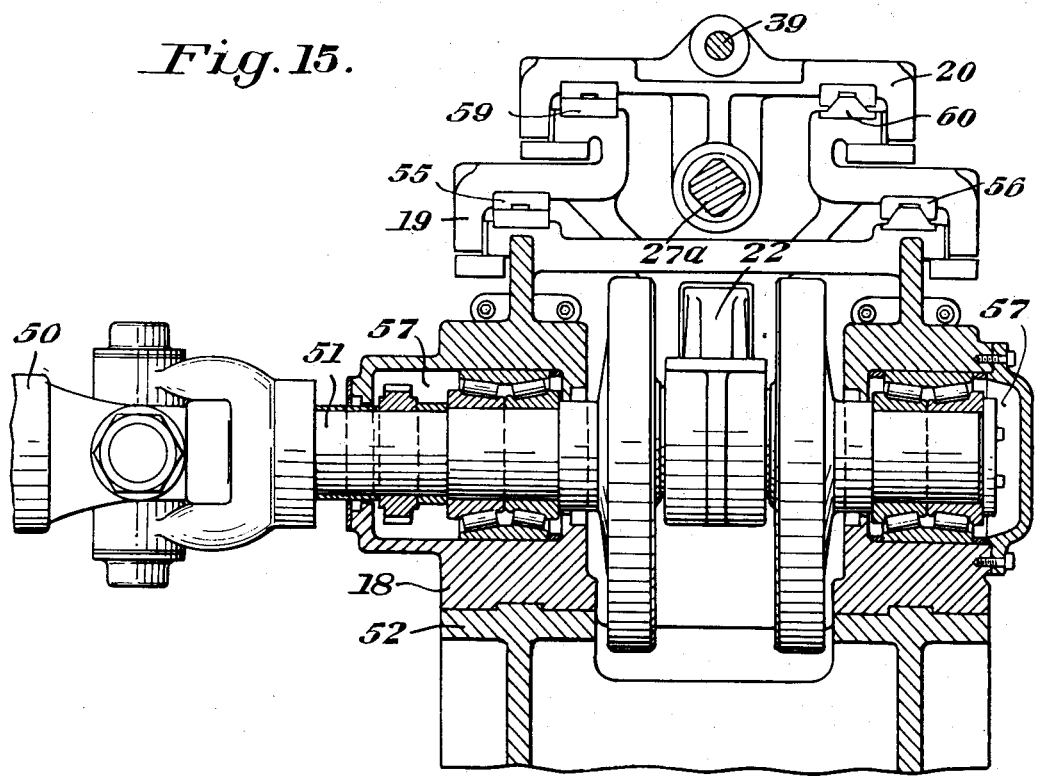
Figure 15 is a section along the lines XV—XV of Figure 9.
Figure 16:
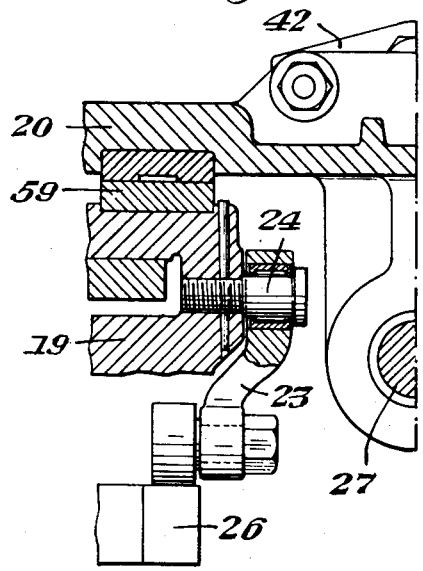
Figure 16 is a section along the lines XVI—XVI of Figure 10.

Figures 8, 9 and 10 show the feed table which comprises the frame 18, the carriage 19 and the workholder 20 previously referred to and a lower frame 52 upon which the frame 18 is supported. The frame 18 may be slid along the lower frame 52 to adjust the extreme forward position of the workholder 20 relative to the rolls R to change the diameter of the center unrolled portion of the blank. The adjustment is made by a jack 53 shown particularly in Figure 10. Shims 54 and bolts hold the two frames in their adjusted position. The carriage 19 slides on the upper frame 18 on slide ways 55 and 56 (see Figure 15) toward and away from the rolls R. The carriage 19 is moved back and forth on the frame 18 by a connecting rod 22 connected to the carriage 19 and the crank shaft 51. The crank shaft 51 is journalled in bearings 57 in the frame 18. A wrist pin 58 connects the connecting rod 22 with the carriage 19. The workholder 20 slides on slide ways 59 and 60 on the carriage 19 toward and away from the rolls R. The forward end of the carriage 19 carries the pin 21 which holds the disk blanks, the pin being so mounted that it can be rotated about a vertical axis in the workholder. As above described, the carriage 19 drives the workholder towards the rolls, latches 23 on the carriage engaging lugs 25 on the workholder for this motion. The construction of the latches 23 which are pivoted on the carriage 19, the lugs 25 on the workholder 20 and the cams 26 on the frame 18 is shown particularly in Figures 16 and 18. Return movement of the workholder 20 (caused by action of the rolls on the blank) is limited by the rubber pads 62 on a bracket 61 on the top of the workholder absorbing some of the force of the blow. Another rubber pad 63 is preferably provided on the piston rod 39 between the bracket 40 and the cross arm 42 to cushion the carriage at the end of its forward movement.

*Indexing mechanism—Figures 10–14 inclusive, 19 and 21*

The purpose of this mechanism is to rotate the disk blank in time with movements of the rolls and of the feed table so that the octagonal blank may be first rolled in a radial direction perpendicular to each peripheral flat, rotated 22½° and thereafter rolled radially through its peripheral corners and midway of the first radii. The indexing mechanism is enclosed in a box 64 carried at the rear of the frame 18 (see Figure 10) and turns the pin 21 on which the disk blanks are mounted, by means of the square shaft 27a, round shaft 27 and miter gears 28.

To rotate the blank in time with movements of the reciprocating carriage 19 and workholder 20 and of the rolls, the indexing mechanism is geared to the crankshaft 51 which drives the carriage 19 which in turn is geared to the roll drive. A gear 65 on the crankshaft 51 drives an idler gear 66 and thereby a third gear 67 having the clutch hub 68 which coacts with the clutch 69. The gear 67 and clutch hub 68 is rotatably mounted on the shaft 70 while the clutch 69 is splined to the shaft, and one face of the clutch hub 68 has one tooth which meshes with the single corresponding tooth on the clutch part 69, thereby effecting synchronized action from the very commencement of a cycle between rolls R and the indexing of the workpiece B. The shaft 70 rotates one side of a flexible coupling 71 provided to compensate for any misalignment. A shaft 72 driven by the other side of the coupling drives a spiral gear 73 which in turn drives a spiral gear 74 keyed to a shaft 75. The Geneva pin 35 is fastened to a driver wheel 35a which is keyed to the shaft 75 and rotates the Geneva wheel 34 which latter is keyed to the shaft 76 (see Figure 12). The clutch collar 33 (which is also keyed to the shaft 76) and the Geneva wheel 34 each have six clutch teeth 33a and 34a cut in opposed hub faces as shown in Figures 21 and 19. However, the collar 33 is keyed to the shaft 76 so that the teeth on the wheel and the collar are 30° out of phase, the driving faces of the teeth on the collar being behind the driving faces of the teeth on the wheel. The gear 30 which, as stated, rotates freely on the shaft 76, has teeth 30a cut in both hub faces, these two sets of teeth being in phase with each other. The gear 30 is driven through either the teeth 33a in the clutch collar 33 or the teeth 34a in the Geneva wheel 34 by being shifted into engagement with one or the other. The gear 30 drives the indexing gear 29 which rotates the square shaft 27a and thereby the disk blanks.

Figure 12:
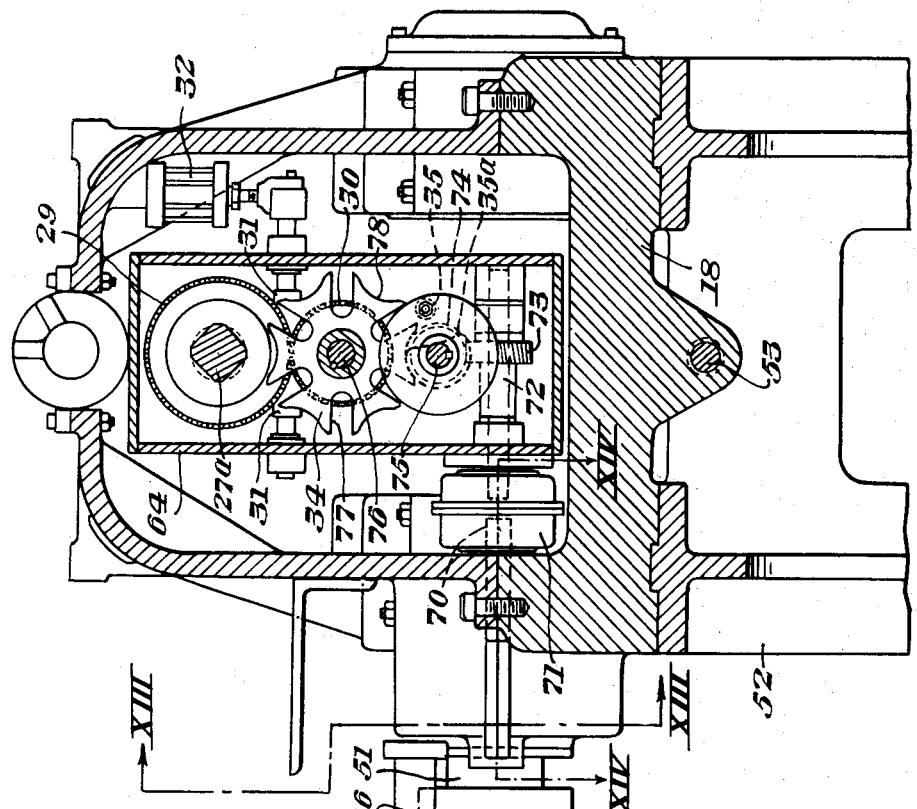
Figure 12 is a section along the lines XII—XII of Figure 9.
Figure 11:
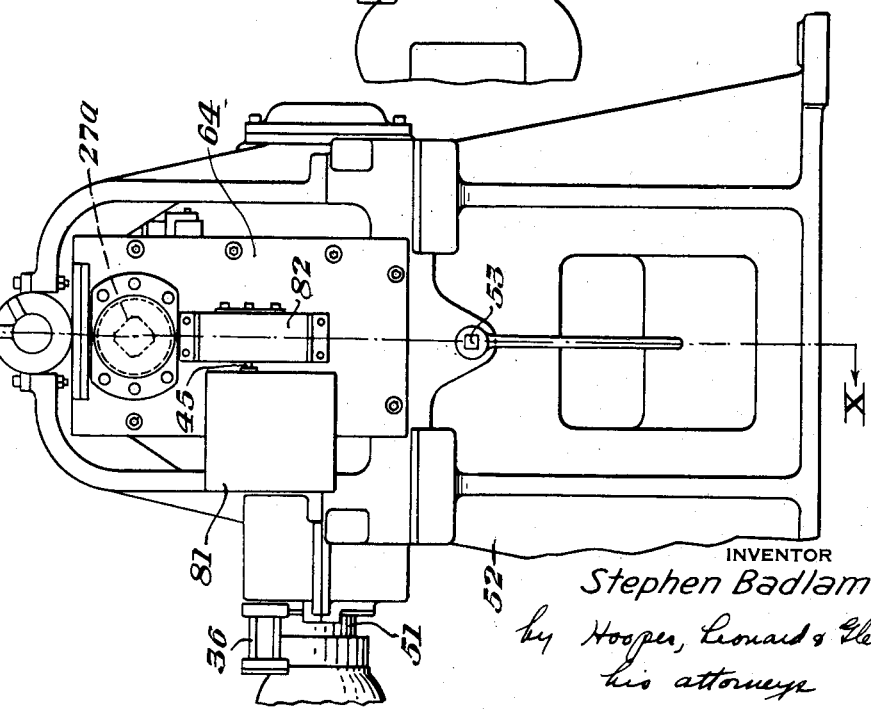
Figure 11 is an end view partly broken away of my feed table.
Figure 14:
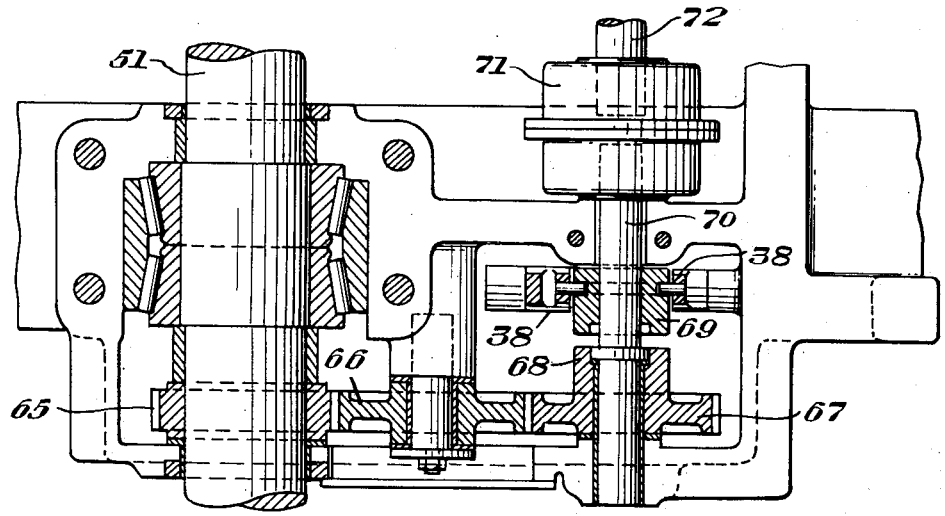
Figure 14 is a section along the lines XIV—XIV of Figure 12.
Figure 13:
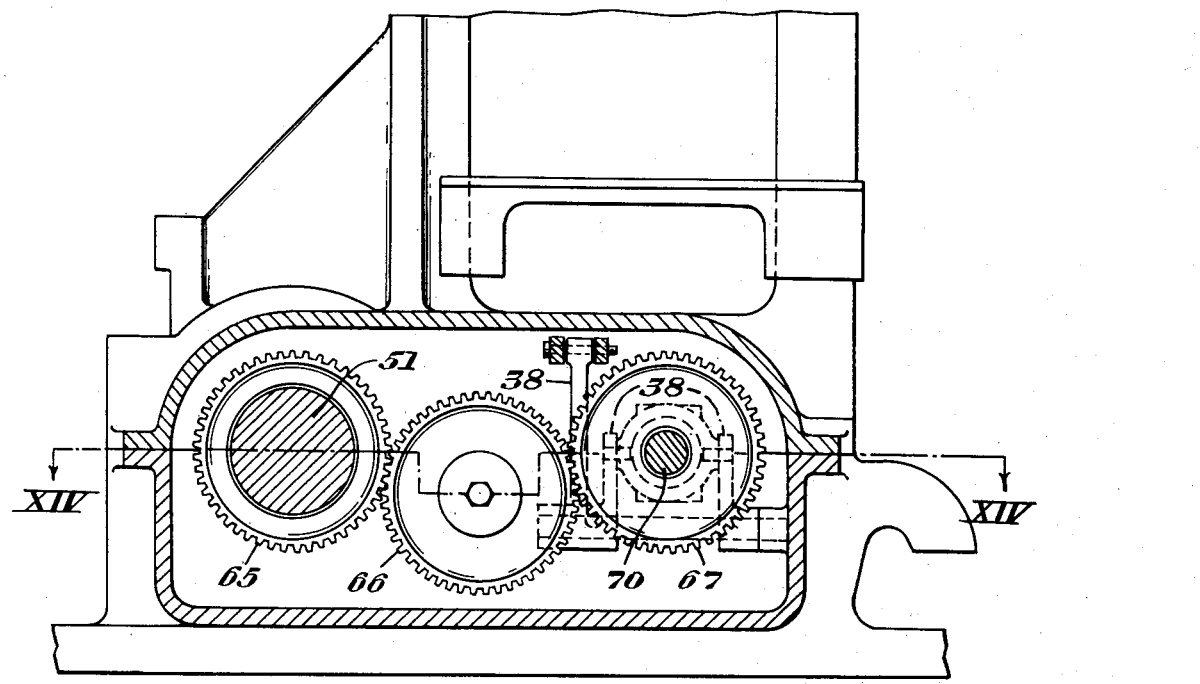
Figure 13 is a section along the lines XIII—XIII of Figure 12.

As above stated the disk blank must be rotated 45° between each of eight passes between the rolls, rotated 22½° and then rotated 45° between each of eight more passes. As shown in Figure 12 the Geneva pin 35 drives the Geneva wheel 34 by entering slots 77 in the wheel 34. The wheel has only six slots and therefore the ratio between the gears 29 and 30 is eight to six in order to rotate the shaft 27a a matter of 45° for each revolution of the pin 35. For reasons hereafter stated, the gear 30 engages the Geneva wheel 34 for the first series of eight passes. To turn the blank 22½° and then 45° between eight more passes the gear 30 is shifted by operation of the cylinder 32 to press it against the clutch collar 33. The teeth 30a on the gear and the teeth 33a on the collar do not immediately engage in their full depth because the teeth 33a are 30° out of phase with the teeth 34a on the Geneva wheel (and therefore the teeth 30a on the gear). As the Geneva pin completes its next full revolution it turns the clutch collar 33 through 60° but the gear 30 does not turn until the collar has turned 30° and the teeth 30a and 33a engage in their full depth. The gear 30 therefore is turned only 30° during this one revolution of the pin 35 and the shaft 27a turns only 22½° because of the six to eight ratio between the gears 30 and 29. Thereafter upon each subsequent full revolution of the pin 35 the gear 30 and shaft 27a will be turned 45°. When the gear 30 is shifted from the collar 33 to the Geneva wheel 34 this same action occurs. That is, during the first revolution of the Geneva pin 35 following the shift the gear 30 is rotated only 30° and the shaft 27a is turned only 22½°. For each subsequent revolution of the Geneva pin 35 the shaft 27a is rotated through 45° so long as the gear 30 engages the Geneva wheel 34.

It is important not only that the disk blank be properly indexed with respect to the rolls but also that it be positively held in the correct position during each press. My indexing mechanism provides a positive lock, the construction of which is best shown in Figure 12. The ends of the teeth 78 of the Geneva wheel 34 are curved inwardly or made concave to form parts of a circle. An enlarged hub on the Geneva driver 35a has a diameter substantially equal to the diameter of the circle portions in the ends of the teeth 78, a portion of the hub being cut away to provide clearance for the extreme ends of the teeth 78 when the wheel 34 turns. When the Geneva pin leaves one of the slots 77 the remaining portion of the hub 35a rotates within the circle portion formed in the end of the following tooth thus preventing rotation of the wheel 34. Likewise the clutch teeth cut in the gear 30, clutch collar 33 and Geneva wheel 34 are designed to prevent back lash. As shown in Figures 19, 20 and 21 the clutches 30a, 33a and 34a each have one face inclined to the common axis of the parts having these clutch teeth and the other side parallel to the common axis. The clutch teeth 30a in the gear 30 are formed with the square projections 30b at the axially outer ends and the clutch teeth 33a and 34a in the clutch collar 33 and Geneva wheel 34 are formed with the square recesses 33b and 34b respectively at the axially inner ends and engageable by the square projections of the clutch teeth of the gear 30 so that the parts are held from becoming accidentally disengaged by any force tending to rotate one of them in reverse.

*Loading and unloading mechanism—Figures 1 to 6 inclusive, 8, 17 and 18*

Figure 17:
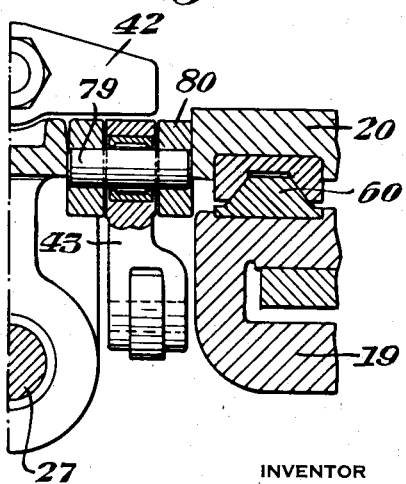
Figure 17 is a section along the lines XVII—XVII of Figure 8.

After the rolling cycle has been completed on one blank, it is necessary that the workholder 20 be moved away from the rolls R beyond the end of its normal return stroke and that the indexing mechanism be disconnected so that the finished disk can be removed from the pin 21 and replaced with a new blank. As before stated the movement of the workholder away from the rolls R beyond the end of its normal return stroke is accomplished by energization of the cylinder 41 and operation of the rod 39 and cross arm 42 to the left. The stopping of the indexing then occurs by energization of the cylinder 36 and operation of the shifter fork 38 to the right to disconnect clutch 69 from its coacting part 68. To start a rolling cycle the cylinder 36 is energized to move the shifter rod 38 to the left to couple the clutch parts 68 and 69 after which timing of the four-way valves and indexing of the blank take place automatically in synchronism with the gear drive of the rolls. As shown in Figures 8, 17 and 18 the latches 43 each rotate about a pin 79 which is held in a frame 80 secured to the top of the workholder 20.

*Controller—Figures 8, 9, 10, 11 and 12*

As before stated the cylinders 32, 36 and 41 act in time with the mill rolls and in the proper sequence. Four-way valves 32a, 36a and 41a housed in a box 81 and cams 45a on the shaft 45 housed in the box 81 control the operation of the cylinders. The shaft 45 is driven in synchronism with the rolls by the shaft 75 of the indexing mechanism which extends through a side of the box 64 into a second box 82 and carries a worm 83 which meshes with and drives a worm gear 84 secured to the shaft 45, the gearing ratio being 1:17 in the embodiment shown.

*Operation of the feed table and indexing means*

In describing the operation of my feed table and indexing mechanism it will be assumed that the workpiece B is in unloading and loading position and that a disk blank has been rolled, removed from the pin 21 and replaced by another blank at which time the parts of the clutch 69 are uncoupled. The pin, therefore, is oriented with respect to the rolls so that the blank placed on the pin has a radius passing through a peripheral corner at right angles to the axis of the rolls, and the blank must be turned 22½° to be first rolled at right angles to its peripheral flats. It will also be assumed that the rolls R are connected to the mill drive and rotating. The carriage 19 therefore is reciprocating on the frame 18.

A second valve in the same line as the valve 36a is manually closed and energized the cylinder 36 to couple the parts of the clutch 69 and thereby connect the drive for the indexing mechanism and the controller to the carriage drive. Since the clutch 69 has only one pair of diametral teeth the indexing mechanism and controlled are automatically connected in synchronism with the carriage and the rolls R so that while the clutch parts are being coupled, the carriage 19 is being moved forward toward the rolls. The controller then energizes the cylinder 41 which through the piston rod 39 moves the workholder B forward by means of the cross arm 42 and the rubber pads 62 to a position where the pull back latches 43 are moved to inoperative position by the cams 44. Then the controller energizes the cylinder 32 which moves the gear 30 to mesh with the Geneva wheel 34 so that the blank is rotated 22½° during the first revolution of the Geneva pin 35. During the operation of the cylinders 41 and 32 and the forward movement of the workholder B and its indexing through 22½° the carriage 19 is moved backward. The indexing then stops and the carriage 19 is moved forward and its pull in latches 23 engage the lugs 25 of the workholder to move the latter forward to a position where these pull in latches are disengaged by the cams 26. Then the dies D of the rolls engage the blank and move it and the workholder backward at a faster rate than the carriage is moved backward. Then the pin is indexed 45° after which the carriage is moved forward and moves with it the workholder, this sequence being carried out until eight passes have been made, after which the controller energizes the cylinder 32 to move the gear 30 into engagement with the clutch collar 33 and thereby index the pin 21 a matter of 22½° after which the carriage 19 is moved forward and carries with it the workholder for another pass along a path or radius passing through a peripheral corner of the blank. Then with the same sequence of operations as occur during the first eight passes eight additional passes are made along the radii passing through the peripheral corners, after which the controller energizes the cylinder 41 which through the piston rod 39 and cross arm 42 and pull back latches 43 moves the workholder backward to its unloading and loading position at which time the controller has energized the cylinder 36 and disconnected the parts of the clutch 69. It should here be noted that while the workholder remains stationary so that blanks can be exchanged on the pin 21, the rolls are not stopped and the carriage 19 continues to reciprocate.

The foregoing description demonstrates that my invention solves all of the problems enumerated in the first part of this specification.

(1) The carriage is synchronized exactly with the rolls of the mill by reason of being positively geared to the mill drive so that the workholder is also synchronized exactly with the mill rolls because it is driven forward by the carriage.

(2) The carriage is reciprocated by a crank and has a motion closely approximating simple harmonic motion with the result that shocks at the ends of its strokes are substantially eliminated. The workholder which is the only portion of the mechanism which moves with the blank during its forward and return movements is relatively light so that the forces involved are much smaller than those encountered in earlier feed tables. Furthermore the workholder is operatively connected to or picked up by the carriage during the initial portion of the movement of the latter toward the mill rolls and disconnected from the carriage during the final portion of the movement of the carriage toward the mill rolls thereby avoiding objectionable shock.

(3) The workholder can be withdrawn from the rolls and held away from the rolls during loading and unloading of blanks and disks. It can be held in this position any length of time desired and when released is automatically picked up by the carriage and moved toward the rolls in perfect synchronism with the timing of the leading edges of the roll dies.

(4) The indexing mechanism rapidly and smoothly rotates the blank to proper position and locks the blank in that position. The Geneva pin enters and leaves the slots in the Geneva wheel substantially radially with the wheel. The Geneva wheel is at rest when the pin enters and leaves and its greatest rotational speed is when the pin is half way between these points. The action of the wheel is thus a close approximation to simple harmonic motion with as much as possible of the shock of rapid acceleration and deceleration eliminated. The engagement between the enlarged hub on the wheel 35a carrying the Geneva pin 35 and the teeth 78 of the Geneva wheel 34 locks the wheel against movement when it is not being turned by the Geneva pin.

(5) The indexing mechanism and the controller are enclosed in boxes located on the table as far as possible from the rolls. They are thus protected from the heat, scale, water, etc., incidental to all hot rolling.

My invention has substantial advantages. The mill may be run at speeds considerably higher than those heretofore possible and with reduced scrap losses. The blanks are properly indexed and therefore they are rolled uniformly along all radii. It is not necessary to trim back as much of the disks as has heretofore been necessary and therefore smaller blanks can be used, with a substantial saving in steel. My machine will operate for extended periods of time without stoppages because of mechanical failure. In tables heretofore used the extreme conditions of wear, shock, etc., have caused frequent breakdowns.

I have described my invention with reference to the rolling of tapered disks on a gap roll mill. However, it may be used to advantage wherever relatively heavy blanks are rapidly fed to and withdrawn from apparatus which performs work on the blanks. The indexing mechanism which I have invented may be used independently of the feed table to orient work blanks relative to machines for performing work on the blanks.

While I have described a present preferred embodiment of my invention it is to be understood that it may be otherwise embodied within the scope of the appended claims.

I claim:

1. A feed table for alternately feeding and withdrawing work blanks to and from a machine for processing the blanks comprising a workholder, a movable support for the workholder, means for reciprocating the support toward and away from the machine, means for engaging the workholder with the support for a forward stroke, and means for disengaging the workholder from the support for a return stroke.

2. A feed table for alternately feeding and withdrawing work blanks to and from a machine for processing the blanks comprising a workholder, a movable support for the workholder, means for reciprocating the support toward and away from the machine, means for engaging the workholder with the support for a forward stroke and means to engage the workholder to cause its return stroke and move it away from the machine and relatively from the support, said last mentioned means being separate from the second mentioned means.

3. A feed table for alternately feeding and withdrawing work blanks to and from a machine for processing the blanks comprising a holder having a rotatable mount for the blanks, a movable support for the holder, means for reciprocating the support toward and away from the machine, means for engaging the holder with the support for a forward stroke, means for disengaging the holder from the support for a return stroke, means for rotating the mount to an indexing position, and means for synchronizing the action of the mount rotating means and the support reciprocating means with the action of the processing machine.

4. In a machine for rolling tapered articles wherein a work piece blank is repeatedly thrust between gap rolls and subjected to their reducing action, a workholder, a movable support for the workholder, means independent of the engagement of the work piece by the gap rolls for reciprocating the support toward and away from the gap rolls, means for engaging the workholder with the support for a forward stroke, means for disengaging the workholder from the support substantially as the gap rolls engage the work piece causing the return movement of the workholder by the rolling action of the gap rolls on the work piece.

5. A feed table for alternately feeding and withdrawing work blanks to and from a machine for processing the blanks comprising a relatively fixed support, an intermediate support movable on the first support, means for reciprocating the intermediate support towards and away from the machine, a workholder, means for engaging the workholder with the intermediate support for a forward stroke, means for disengaging the workholder from the intermediate support for a return stroke, means for adjusting the first named support towards and away from the machine so that blanks of varying sizes of unrolled center areas can be processed on the machine without varying the stroke of the intermediate support or the workholder.

6. A feed table for alternately feeding and withdrawing work blanks to and from a machine for processing the blanks comprising a workholder, a carriage slidably supporting the workholder and movable towards and away from the processing machine, a reciprocating drive for the carriage, latch members to engage the workholder with the carriage for a forward stroke, and unlatching members to disengage the workholder from the carriage for a return stroke.

7. A feed table for alternately feeding and withdrawing work blanks to and from a machine for processing the blanks comprising a workholder, a frame, a carriage slidably supporting the workholder and movable on the frame towards and away from the machine, a reciprocating drive for the carriage, a latch on the carriage to engage the workholder on forward movement of the carriage to drive the workholder towards the machine and a cam on the frame to release the workholder at the end of the forward stroke of the carriage..

8. A feed table for alternately feeding and withdrawing work blanks to and from a machine for processing the blanks comprising a workholder, a carriage movably supporting the workholder and movable towards and away from the processing machine, a reciprocating drive for the carriage, means on the carriage to engage the workholder for moving the workholder on a forward stroke and means operable during certain return strokes of the carriage to withdraw the workholder out of the path of engagement by the first mentioned means.

9. A feed table for alternately feeding and withdrawing work blanks to and from a machine for processing the blanks comprising a frame, a workholder, a carriage slidably supporting the workholder and movable on the frame towards and away from the machine, a reciprocating drive for the carriage, means on the carriage to engage the workholder for moving the workholder on a forward stroke, a movable member carried by the frame, means on the workholder to engage the member whereby movment of the member away from the machine draws the workholder out of the path of engagement with the first mentioned means and means on the carriage to release the engagement of said second mentioned means and member at the end of the return stroke of said carriage.

10. A feed table for alternately feeding and withdrawing work blanks to and from a machine for processing the blanks comprising a carriage movable towards and away from the machine, a reciprocating drive for the carriage geared to the machine drive, a workholder having means for rotatably holding the work blanks and movable on the carriage towards and away from the processing machine, means on the carriage to engage the workholder for a forward stroke, means to disengage the workholder and the carriage prior to their respectively separate return strokes, and means geared to the machine drive for rotating the work blank holding means.

11. A feed table for alternately feeding and withdrawing work blanks to and from a machine for processing the blanks comprising a carriage movable towards and away from the machine, a reciprocating drive for the carriage, a rotatable mount for a work blank movable on the carriage towards and away from the machine, means for driving the mount towards the machine, separate drives geared to the machine drive for rotating the mount different amounts, and means for preselecting the sequence of such drives.

12. A feed table for alternately feeding and withdrawing blanks to and from a machine for processing the blanks comprising a workholder having means to rotatably mount a blank, a carriage supporting the workholder and movable towards and away from the machine, a reciprocating drive for the carriage geared to the drive for the machine, means on the carriage to engage the workholder for a forward stroke, means to disengage the workholder from the carriage prior to their respectively separate return strokes, and indexing means substantially continuously geared to the carriage drive to rotate the blank mounting means with respect to the machine.

13. A feed table for alternately feeding and withdrawing work blanks to and from a machine for processing the blanks comprising a workholder having means for rotatably carrying blanks, a relatively fixed support, an intermediate support for the workholder and movable on the first support toward and away from the machine, a reciprocating drive geared to the machine drive and for the intermediate support, means on the intermediate support to engage the workholder for a forward stroke, means on the relatively fixed support to disengage the workholder and the intermediate support adjacent the end of said forward stroke, a drive geared to the drive for the machine to rotate the blanks after withdrawal thereof by the workholder, and a controller also geared to the machine drive to time the action of the drive for rotating the blank carrying means.

14. A feed table for feeding a work blank to a machine for processing the blank comprising a carriage reciprocable toward and away from the machine, means for reciprocating the carriage with substantially simple harmonic motion, a holder for the work blank movable away from the machine independently of the movement of the carriage away from the machine and means for operatively connecting the holder to the carriage substantially only upon movement of the carriage toward the machine for moving the holder toward the machine.

15. A feed mechanism for feeding a work blank to a machine for processing the blank comprising a support reciprocable toward and away from the machine, a holder for the work blank reciprocable toward and away from the machine and movable away from said support, cooperating means on the support and holder for moving the holder toward the machine substantially only upon movement of the support toward the machine, and means for releasing the cooperating means during movement of the holder toward the machine.

16. In a feed table for a rolling mill having gap rolls, a reciprocating workholder for a work piece, means for driving said workholder in synchronism with said rolls, means for intermittently rotating said work piece, and a positive clutch adapted to connect both said means during an operative cycle, said clutch having a part associated with each of said means, each of said parts having a single tooth for clutching engagement during said operative cycle, whereby both said means are synchronized to effect the intermittent rotation of said work piece when it is not in engagement with said rolls.

17. In a feed table for alternately feeding and withdrawing work blanks to and from a machine for processing the blanks, in combination, a frame having a frame slideway extending in the direction of said machine, a reciprocating carriage slidably supported on said slideway, said carriage having a carriage slideway, a workholder slidably supported on said carriage slideway, a positive drive to reciprocate said carriage on said frame slideway, means connected to said carriage to engage said workholder during a forward stroke of said carriage toward said machine, means to disengage said workholder and carriage near the end of said forward stroke, and means to return said workholder on said carriage slideway at a different rate of return than the rate of return of said carriage on its return stroke.

18. In a feed table for alternately feeding and withdrawing work blanks to and from a machine for processing the blanks, in combination, a frame having a frame slideway extending in the direction of said machine, a reciprocating carriage slidably supported on said slideway, said carriage having a carriage slideway, a workholder slidably supported on said carriage slideway, a pin rotatably mounted in said workholder to carry said blanks, a positive drive to reciprocate said carriage on said frame slideway, a slidable shaft in positive connection with said pin to rotate it, a gearing member slidably keyed to such shaft, means connected to said carriage to engage said workholder during a forward stroke of said carriage toward said machine, means to disengage said first mentioned means and said workholder near the end of said forward stroke, means to return said workholder on said carriage slideway at a different rate of return than the rate of return of the return stroke of said carriage, and timed means to rotate said gearing member to turn said shaft when said blanks are not engaged by said machine.

References Cited in the file of this patent

UNITED STATES PATENTS

| Number | Name | Date |
|---|---|---|
| 376,942 | Clyne | Jan. 24, 1888 |
| 1,894,689 | Ingersoll | Jan. 17, 1933 |
| 1,940,142 | Ott | Dec. 19, 1933 |
| 2,062,564 | Farr | Dec. 1, 1936 |
| 2,170,291 | Martellotti | Aug. 22, 1939 |
| 2,368,890 | Sherrow | Feb. 6, 1945 |
| 2,370,367 | Marsilius | Feb. 27, 1945 |
| 2,390,596 | Larsen | Dec. 11, 1945 |
| 2,392,964 | Armitage et al. | Jan. 15, 1946 |
| 2,483,811 | Cullen | Oct. 4, 1949 |